United States Patent

Shannon

[15] 3,663,181
[45] May 16, 1972

[54] ORTHORHOMBIC PLATINUM-METAL OXIDES OF TYPE $Pt_3MO_6$

[72] Inventor: Robert D. Shannon, Wilmington, Del.

[73] Assignee: E. I. du Pont de Nemours and Company, Wilmington, Del.

[22] Filed: June 22, 1970

[21] Appl. No.: 48,500

[52] U.S. Cl..............................23/315, 208/143, 252/472, 252/473, 23/50 R
[51] Int. Cl..........................................................C01g 55/00
[58] Field of Search...............................................23/50, 315

[56] References Cited

UNITED STATES PATENTS 3,514,414  5/1970  Shannon..................................23/50 X
3,498,931  3/1970  Rogers et al............................23/50 X
3,414,371  12/1968 Rogers.......................................23/50

OTHER PUBLICATIONS

Reisman et al., " Journal of The American Chemical Society," Vol. 77, April 1955, pp. 2115–2119.
Mullen et al., " Journal of the Less–Common Metals," Vol. 19, pp. 209–214, Nov. 1969.

*Primary Examiner*—Herbert T. Carter
*Attorney*—James A. Costello

[57] ABSTRACT

Disclosed herein are orthorhombic platinum-metal oxides of the type $Pt_3MO_6$, wherein: M = Mn, Fe, Co, Ni, Cu, Zn, Mg, or Cd; and process for making these oxides which are catalysts for the hydrogenation of ethylene.

16 Claims, No Drawings

ORTHORHOMBIC PLATINUM-METAL OXIDES OF TYPE $PT_3MO_6$

BACKGROUND OF THE INVENTION

1. Field of the Invention

This invention relates to new ternary oxide compositions of certain divalent metals and platinum, having a distinctive orthorhombic crystal structure.

2. Description of the Prior Art

Ternary platinum-metal oxides are not common because of the inherent instability of the binary platinum oxide reagents and attempts made to synthesize them have met with little success. For instance, low pressures were employed in British Pat. No. 1,134,111. The resulting products are described as intimate homogeneous mixtures. The novel compositions disclosed herein are made at much higher pressures by a new process.

SUMMARY OF THE INVENTION

The products of the invention are platinum-metal oxides of orthorhombic crystal structure having the prototype formula, $Pt_3MO_6$, wherein M is Mn, Fe, Co, Ni, Cu, Zn, Mg, or Cd.

The metals combining with platinum in these ternary oxides all have well-known divalent ions with ionic radii of intermediate size in the range from about 0.65 to 0.95A. Divalent ions of larger or smaller size do not form the characteristic orthorhombic structure described herein. Other divalent metal ions that have the appropriate size, lack sufficient oxidative stability to form the novel structures under the conditions employed herein.

The novel ternary platinum oxides all have the approximate formula, $Pt_3MO_6$. However, it is to be understood that this formula represents an ideal or prototype composition. As will be appreciated by those skilled in the mineralogical arts, deviations from the prototype composition can be quite extensive without major alteration in the properties of these ternary oxides or in the structural relationships by which they can be identified.

The novel products of the approximate or prototype formula, $Pt_3MO_6$, can have from 2.2 to 3.2 gram atoms of platinum per formula weight and still retain the characteristic orthorhombic structure. The characteristic orthorhombic structure is likewise retained over an operable range of gram atoms of metal (M) from the prototype value of 1.0 to as much as 1.4. Furthermore, the total gram atoms of metal need not have the precise relationship to the gram atoms of oxygen as the 4.0/6.0 ratio indicated by the prototype formula. Thus, there may be from about 3.2 to 4.3 gram atoms of total metal for every 6 gram atoms of oxygen.

Such variation in oxygen content is common in minerals containing elements of variable oxidation state and is not surprising in the oxides of this invention since these oxides contain both $Pt^{+2}$ and $Pt^{+4}$ ions as well as other metal ions, many of which readily adopt mixed oxidation states.

The products of this invention may also be described as orthorhombic platinum-metal oxides having the general formula $Pt_xM_yO_6$, wherein M is selected from the group consisting of Mn, Fe, Co, Ni, Cu, Zn, Mg, and Cd; $x$ is from about 2.2 to 3.2; $y$ is from about 1.0 to 1.4 and the sum of $x+y$ is from about 3.2 to 4.3. In especially preferred products of the general formula, $Pt_xM_yO_6$, $x$ is from about 2.6 to 3.0, $y$ is from about 1.0 to 1.4 and $x+y$ is from about 3.6 to 4.3.

A characteristic and invariant feature of the products of this invention is their orthorhombic crystal structure. This is manifest by a distinctive X-ray diffraction pattern, examples of which are shown in Table I. Each pattern was determined by methods well-known in the art on a sample prepared by a method herein described and having a composition typified by the approximate formula, $Pt_3MO_6$, where M is shown in the column heading for each sample.

The dimensions, $a$, $b$, and $c$, lattice constants characterizing the unit orthorhombic cell, are obtained in a well-known manner from X-ray diffraction patterns and are reported in Table II for a number of platinum metal oxides, some of which are specifically exemplified herein. Lattice constants of orthorhombic oxides included within the scope of this invention but not specifically detailed herein, are included in the Table for completeness. In all cases, synthesis conditions used in the preparation of each sample are shown.

The lattice constants reported are generally accurate to within 0.01A. Where applicable in Table II, the standard deviation for the last reported decimal place is shown. The X-ray techniques used are described in "The Interpretation of X-ray Diffraction Photographs" by H. F. M. Henry, H. Lipson, and W. A. Wooster, MacMillan & Co. Ltd., London, 1960. The values of the lattice constants shown in Table II indicate a small but real variation with changes in the metal M. They also indicate some small variations in lattice constants for samples having the same metallic components but prepared differently. This is indicative of slight variation in stoichiometric composition.

A detailed X-ray structure analysis was made on a single crystal of approximate stoichiometric formula, $Pt_3CdO_6$. The orthorhombic structure has the characteristic space group Cmmm. The unique crystal structure fits the formula $Pt^{+2}Pt_2^{+4}Cd^{+2}O_6$ in which the $Pt^{+2}$ ions have square planar coordination, the $Pt^{+4}$ ions octahedral coordination, and the $Cd^{+2}$ ions are eight coordinated by oxygen. The same structure is indicated for oxides of approximate stoichiometric formula, $Pt_3MO_6$, where M is Mn, Fe, Co, Ni, Zn, or Mg. The copper platinum oxide of approximate stoichiometry, $Pt_3CuO_6$, has a slightly more elongated orthorhombic unit cell and belongs to the slightly different Pnnm or Pnn2 space group.

DESCRIPTION OF THE PREFERRED EMBODIMENTS

The novel process for preparing the instant platinum-metal oxides comprises contacting a reactant selected from the group consisting of platinum, platinum oxides and platinum halides with at least one reactant selected from the group consisting of Mn, Fe, Co, Ni, Cu, Zn, Mg, Cd, their oxides and halides. The reaction is carried out in an oxygen-rich environment at an elevated temperature and at a pressure of at least 100 atmospheres.

The novel products of this invention are prepared in sealed systems using external pressures from 100 atmospheres to 65 kbar (1 kbar=1013 atmospheres). Preferred pressures are from about 200 to 3000 atmospheres (approximately 0.2 to 3 kbars). These significant external pressures are necessary to prevent decomposition of the platinum oxide. The reaction temperature must be sufficient for the reaction to proceed but not so great as to cause product or reactant decomposition at the pressure used. In this regard, temperature and pressure are interrelated. At the pressures taught herein, temperatures of about 500° to 1000° C. will generally be satisfactory. Reaction times should be sufficient to allow complete reaction. Usually, 8 to 24 hours is satisfactory.

The forms in which the products are produced may be polycrystalline sintered compacts, single crystals, or fine powders.

The reactants are reagent- or commercial-grade metals, their oxides, chlorides or other halides. If sufficient oxygen is not provided by the reactant oxides it can be introduced by pressuring with an oxygen-rich atmosphere. Alternatively, an oxygen-rich environment can be generated internally by the decomposition of $KClO_3$, $NaClO_3$ or other oxygen-rich compounds. The proportions of the reactants may be chosen to yield the stoichiometry desired in the final product. Alternatively, an excess of a reactant may be used to increase the speed of reaction. The container may be any material which will withstand the applied pressure and which will not react with the reactants herein. Preferably, the container is platinum or gold.

An alternate step may be employed in the process of this invention. In that step, water or aqueous hydrogen chloride is added to the reactants before the reaction tube is closed. The presence of the water or aqueous hydrogen chloride increases the contact between the reactants. The addition of water with or without the hydrogen chloride has been found especially propitious when it is sought to produce single crystals. When using water and particularly aqueous acid media it is advantageous to add relatively larger proportions of the non-platinum metal to allow for some solubility.

The novel products of this invention are insoluble in aqueous acids such as HCl, $HNO_3$ and $H_2SO_4$. At atmospheric pressures or at pressures slightly higher than atmospheric, the products are decomposed by heating in air at temperatures above about 600° C.

The following non-limiting Examples are included within the broad scope of this invention. They are offered as illustrative of the subject matter contained herein.

SPECIFIC EMBODIMENTS

Example 1

A thin-walled gold tube 2½ inches long and three-eighths inch in diameter, capable of collapsing and responding to internal or external pressure, was charged with 0.261 gm. of $Co_3O_4$, 0.739 gm. of $PtO_2$, and 1.5 cc. of distilled water. The tube was sealed at both ends and placed in a pressure vessel capable of with-standing high pressures and temperatures. The tube was then pressured to 3000 atmospheres, heated to 700° C. for 24 hr. and cooled slowly to room temperature. After opening the tube, there was isolated a fine black powder. X-ray diffraction analysis of the black powder showed it to contain the orthorhombic platinum cobalt oxide.

Example 2

A mixture of 1.431 g. of $PtO_2$, 0.245 g. of Pt, and 0.324 g. of CdO was prepared by grinding in an agate mortar. A pellet of this material weighing 0.616 g. was prepressed at 10 tons per in.$^2$ and placed in a platinum container which was in turn placed in a boron nitride container. This assembly was fitted into a graphite sleeve, serving as a resistance heater, and placed in a tetrahedral anvil press. A pressure of 65,000 atmospheres was applied and the temperature was raised to 1,050° C. for 1 hour after which the power was turned off, thereby quenching the sample rapidly. The tetrahedral anvil device was described by E. F. Lloyd et al., J. of Research, National Bureau of Standards, 63C, 59 (1959).

The sample when removed from the platinum container had a fine grained black appearance, X-ray diffraction analysis showed the single phase product of the type, $Pt_3CdO_6$, to have these orthorhombic unit cell dimensions: $a = 7.213$, $b = 10.191$, and $c = 3.160$A. See Table II, No. 2.

Example 3

A thin-walled Pt tube 5 inches in length and three-eighths inch in diameter was charged with 0.674 g. of $PtCl_2$, 0.326 g. of CdO, 0.500 g. of $KClO_3$, and 1 cc. of water. The tube and contents were pressurized to 3,000 atmospheres and held at 700° C. for 24 hrs. and cooled slowly to room temperature. The product consisted of transparent needles, metallic Pt crystals and black opaque needle-like crystals. The black needles were found by X-ray precession photographs to have the space group Cmmm, Cmm2, or C222 and unit cell dimensions, $a = 7.214$, $b = 10.190$, and $c = 3.165$. See Table II, No. 3. Further structure analysis showed the $Pt_3CdO_6$ phase to have a unique crystal structure having the space group Cmmm and the formula, $Pt^{+2}Pt_2^{+4}Cd^{+2}O_6$, in which the $Pt^{+2}$ ions have square planar coordination, the $Pt^{+4}$ ions octahedral coordination, and the $Cd^{+2}$ ions are eight coordinated by oxygen ions.

Example 4

A mixture of 1.247 g. of $PtO_2$ and 0.440 g. $Co_3O_4$, 1.0 cc aq. conc. HCl solution, and 3.0 cc distilled water was placed in a 5 inch long gold tube. The tube was sealed at both ends, pressurized to 3,000 atmospheres, heated to 700° C. for 24 hr. and cooled slowly. A brown powder resulted after washing and drying the product. X-ray analysis showed a mixture of the orthorhombic platinum cobalt oxide and $PtO_2$. To complete the reaction and replace cobalt that had been dissolved, 0.4 g. of this brown powder, 0.40 gm. of $Co_3O_4$, 2 cc of water and 1 cc of aqueous HCl solution were placed in a 4 inch long gold tube. The tube was sealed and heated under the same conditions as the first tube. The product was shown by X-ray powder diffraction analysis to have orthorhombic symmetry with cell dimensions of $a = 7.082$, $b = 9.923$, $c = 3.142$A. See Table II, No. 26.

Chemical analysis of this product gave 78.03% Pt; 9.87% Co, and 13.1% O, which indicates the composition $Pt_{2.94}Co_{1.23}O_{6.00}$.

Example 5

A mixture of 0.217 g. $PtO_2$ and 0.033 g. $Co_3O_4$ was pressed into a pellet approximately 1/4 inch long × 1/4 inch in diameter. The pellet was placed in a platinum tube which was then sealed and placed in a pressure vessel. The tube and contents were heated at a pressure of 1000 bars and at a temperature of 850° C. for 8 hours and quenched. The tube when opened yielded a black pellet whose X-ray diffraction pattern indicated a pure orthorhombic phase of the $Pt_3CoO_6$ type with $a = 7.086$, $b = 9.930$, and $c = 3.125$A. See Table II, No. 25.

Example 6

A mixture of 0.790 g. of $PtCl_2$, 0.210 g. of MnO, 0.50 g. of $KClO_3$ and 1 cc. $H_2O$ were sealed in a 5 inch Pt tube and heated in same way as in example 3. The product was composed of black opaque needle-like crystals, red transparent crystals, yellow transparent crystals and Pt metal. The black crystals, when isolated, showed an X-ray diffraction pattern having orthorhombic symmetry with $a = 7.149$, $b = 10.041$, and $c = 3.154$A. See Table II, No. 20. Chemical analysis showed 75.5% Pt, 10.6% Mn, and 13.5% O, the composition being $Pt_{2.78}Mn_{1.39}O_{6.0}$.

Example 7

A mixture of 0.432 g. of $PtO_2$ and 0.067 g. of MnO was pelletized as in Example 5 and heated at 3 kbar to 850° C. for 12 hrs. and cooled slowly. One of the products was found to be a platinum manganese oxide of the type, $Pt_3MnO_6$, having an orthorhombic unit cell with $a = 7.16$, $b = 10.05$, and $c = 3.12$A. See Table II, No. 18.

Example 8

A mixture of 0.766 gm. of $PtCl_2$, 0.234 gm. of ZnO, 0.50 gm. of $KClO_3$, and 1 cc. $H_2O$ were placed in a 5 inch Pt tube. The tube and contents were treated as in examples 3 and 6. The product was composed of fine gray powder, yellow transparent crystals, Pt crystals, and a small quantity of opaque black needles. X-ray precession photographs of the needles showed them to be the orthorhombic phase of the type, $Pt_3ZnO_6$, with $a = 7.14$, $b = 9.98$, and $c = 3.15$A. See Table II, No. 9.

Example 9

A mixture of 0.424 g. $PtO_2$ and 0.076 g. of ZnO was pelletized and sealed in a 2 ½ inch Pt tube. The tube and contents were treated in the same way as in Example 7. The product contained a platinum zinc oxide phase of the type, $Pt_3ZnO_6$, having orthorhombic symmetry with $a = 7.123$, $b = 9.887$, and $c = 3.14$A. See Table II, No. 7.

Example 10

A mixture of 0.432 g. $PtO_2$, 0.051 g. of $Fe_2O_3$ and 0.017 gm. Fe was ground and pelleted and sealed in a Pt tube. This tube and contents were treated as in Example 7. The contents were found by X-ray powder diffraction to contain an orthorhombic platinum iron oxide phase of the type, $Pt_3FeO_6$, with $a = 7.11$, $b = 9.92$, and $c = 3.10A$. See Table II, No. 22.

Example 11

A mixture of 0.430 g. $PtO_2$ and 0.071 g. of NiO was ground and pelletized and sealed in a Pt tube. The tube and contents were treated in the same manner as examples 7, 9, and 10. The product was a fine gray powder which was shown by X-ray diffraction to contain an orthorhombic phase of the type, $Pt_3NiO_6$, with $a = 7.104$, $b = 9.888$, and $c = 3.115A$. See Table II, No. 13.

Example 12

A mixture of 0.8684 g. $PtCl_2$, 0.132 g. of MgO, 0.50 g. of $KClO_3$, and 1 cc. water were sealed into a 5 inch long Pt tube. The tube and its contents were treated in the same manner as examples 3, 6, and 8. A fibrous black phase was isolated and was identified by X-ray diffraction as an orthorhombic phase of the type, $Pt_3MgO_6$, with $a = 7.138$, $b = 9.948$, and $c = 3.135A$. See Table II, No. 4.

Example 13

A mixture of 0.626 g. $PtCl_2$, 0.374 g. CuO, 0.50 g. $KClO_3$ and 1 cc. $H_2O$ was sealed in a Pt tube. The tube and its contents were treated as in examples 3, 6, 8, and 12. The product contained fine black needle-like crystals which were identified by X-ray diffraction patterns to be an orthorhombic phase of the type $Pt_3CuO_6$ with $a = 6.120$, $b = 11.574$, and $c = 3.099A$. See Table II, No. 17. Single crystal X-ray precession patterns showed the crystals to have space group Pnnm or Pnn2. This crystal structure is similar but not identical to that of the other oxides of the type, $Pt_3MO_6$, wherein M is Mn, Fe, Co, Ni, Zn, Mg, and Cd.

Example 14

A mixture of 0.426 g. of $PtO_2$ and 0.74 g. of CuO was ground and pelletized and sealed in a Pt tube. The sample was treated as in examples 7, 9, 10, and 11. The product was a gray powder which was shown by X-ray diffraction to contain an orthorhombic $Pt_3CuO_6$ type phase with cell dimensions $a = 6.10$, $b = 11.62$, and $c = 3.10A$. See Table II, No. 15.

Example 15

A mixture of 0.851 g. of $PtO_2$ and 0.149 g. of CuO was sealed in a Pt tube and was heated to 850° C. for 24 hrs. at a pressure of 1,000 atmospheres and cooled slowly to room temperature. The product was a fine-grained black material and was identified by X-ray diffraction to be an orthorhombic platinum copper oxide with $a = 6.105$, $b = 11.567$, and $c = 3.099A$. See Table II, No. 16.

TABLE II

Cell Dimensions of Novel Orthorhombic Oxides Having the Approximate Formula $Pt_3MO_6$

| No. | Component M | synthesis conditions | | a, A | b, A | c, A |
|---|---|---|---|---|---|---|
| 1 | Cd | 850°C | 3 kbar | 7.208 | 10.20 | 3.120 |
| 2 | | 1050°C | 65 kbar | 7.2135±5 | 10.1914±8 | 3.1614±2 |
| 3 | | 700°C | 3 kbar | 7.2144±6 | 10.1902±9 | 3.1650±2 |
| 4 | Mg | 700°C | 3 kbar | 7.138±2 | 9.948±2 | 3.1346±5 |
| 5 | | 850°C | 1 kbar | 7.1157±5 | 9.9272±7 | 3.1501±2 |
| 6 | | 1050°C | 65 kbar | 7.1112±6 | 9.925±9 | 3.1528±3 |
| 7 | Zn | 850°C | 3 kbar | 7.123±3 | 9.887±4 | 3.146±2 |
| 8 | | 850°C. | 1 kbar | 7.131±3 | 9.860±5 | 3.155±2 |
| 9 | | 700°C | 3 kbar | 7.14±3 | 9.98±3 | 3.15±3 |
| 10 | | 1050°C | 65 kbar | 7.1281±6 | 9.9503±8 | 3.1407±2 |
| 11 | | 1050°C | 65 kbar | 7.1266±9 | 9.949±1 | 3.1423±5 |
| 12 | Ni | 1100°C | 65 kbar | 7.099±4 | 9.904±6 | 3.112±2 |
| 13 | | 850°C | 3 kbar | 7.104 | 9.888 | 3.115 |
| 14 | | 1050°C | 65 kbar | 7.09±1 | 9.99±2 | 3.116±3 |
| 15 | Cu | 850° C | 3 kbar | 6.10 | 11.62 | 3.097 |
| 16 | | 850°C | 1 kbar | 6.1050±6 | 11.5670±9 | 3.0987±3 |
| 17 | | 700°C | 3 kbar | 6.1200±9 | 11.574±1 | 3.0987±3 |
| 18 | Mn | 850°C | 3 kbar | 7.16 | 10.05 | 3.12 |
| 19 | | 1100°C | 65 kbar | 7.0830±6 | 9.903±2 | 3.1080±5 |
| 20 | | 700°C | 3 kbar | 7.1486±5 | 10.0413±8 | 3.1536±3 |
| 21 | | 700°C | 3 kbar | 7.142 | 10.025 | 3.155 |
| 22 | Fe | 850°C | 3 kbar | 7.11 | 9.92 | 3.10 |
| 23 | Co | 1000°C | 65 kbar | 7.083 | 9.927 | 3.117 |
| 24 | | 850°C | 3 kbar | 7.083 | 9.933 | 3.139 |
| 25 | | 850°C | 1 kbar | 7.086 | 9.930 | 3.125 |
| 26 | | 700°C | 3 kbar | 7.082 | 9.923 | 3.142 |
| 27 | | 700°C | 3 kbar | 7.080±1 | 9.926±1 | 3.1520±5 |

UTILITY

The novel products of this invention prepared by the methods described above were tested as catalysts for the hydrogenation of ethylene. Catalytic activity was evaluated in standard 12 oz. Pyrex pressure bottles of 350 ml. capacity. The general procedure which was followed is described below.

The bottle is fitted with a stainless steel head, secured by a collar and sealed with an O-ring, which contains a sample port sealed with a silicone rubber serum cap and an outlet, via a one-eighth inch stainless steel jumper tube and a valve, to a stainless steel bottle of 470 ml. capacity. The stainless steel bottle is fitted with three inlets, via valves, for two gases and vacuum and with a vacuum-pressure gauge, 30 in. Hg. vacuum to 60 p.s.i.g. pressure, which is equipped with a 60 p.s.i.g. rupture disc.

Reaction mixtures are stirred magnetically, and temperature is controlled by immersing the bottle in an oil bath at the appropriate temperature. The catalyst sample is weighed into the bottle, the bottle is stoppered, attached to the stainless steel apparatus and flushed with a stream of $N_2$. Deaerated solvent (10 ml.) is added, the system is closed and evacuated, and is then ready for admission of the reactant gases, hydrogen and ethylene. A drop in pressure is noted if the catalyst is effective for hydrogenating ethylene.

Example A

A pressure bottle was charged with a catalytic amount, 0.3 g. of platinum cobalt oxide prepared by the method of Example 4. To the bottle was added 10 ml. acetic acid and equal molar proportions of ethylene and hydrogen at 25° C. and 30 p.s.i. Hydrogenation of ethylene was noted by the pressure drop.

Example B

A pressure bottle was charged with 0.08 g. of the orthorhombic platinum cadmium oxide prepared by the method of Example 3. To the bottle was added 10 ml. acetic acid, and equal molar proportions of ethylene and hydrogen at 110° C. and 27 p.s.i. Slow hydrogenation of the ethylene was observed.

Example C

A pressure bottle was charged with 0.21 g. of the platinum copper oxide composition made in Example 15, 10 ml. of acetic acid, and equal molar proportions of ethylene and hydrogen at 25° C. and 27 p.s.i. Rapid hydrogenation was observed.

Example D

A pressure bottle was charged with 0.25 g. of a platinum magnesium oxide prepared by the same method used for Example 15, 10 ml. of acetic acid, and equal molar proportions of ethylene and hydrogen at 25° C. and 27 p.s.i. Rapid hydrogenation was observed.

Example E

A pressure bottle was charged with 0.03 g. of the orthorhombic $Pt_{2.78}Mn_{1.39}O_6$, (from Example 6), 10 ml. of acetic acid, and equal molar proportions of ethylene and hydrogen at 25° C. and 27 p.s.i. Rapid hydrogenation was observed.

TABLE I

X-ray diffraction patterns of novel orthorhombic oxides having the approximate formula, $Pt_3MO_6$

| M=Cd | | | | M=Mg | | | | M=Zn | | | | M=Ni | | | | M=Cu | | | | M=Mn | | | | M=Co | | | |
|---|---|---|---|---|---|---|---|---|---|---|---|---|---|---|---|---|---|---|---|---|---|---|---|---|---|---|---|
| h | k | l | $d_{obs}$ | $I/I_0$ | h | k | l | $d_{obs}$ | $I/I_0$ | h | k | l | $d_{obs}$ | $I/I_0$ | h | k | l | $d_{obs}$ | $I/I_0$ | h | k | l | $d_{obs}$ | $I/I_0$ | h | k | l | $d_{obs}$ | $I/I_0$ | h | k | l | $d_{obs}$ | $I/I_0$ |
| 1 | 1 | 0 | 5.889 | 40 | 1 | 1 | 0 | 5.800 | 80 | 1 | 1 | 0 | 5.803 | 55 | 1 | 1 | 0 | 5.774 | 10 | 0 | 2 | 0 | 5.784 | 10 | 1 | 1 | 0 | 5.821 | 80 | 1 | 1 | 0 | 5.762 | 25 |
| 0 | 2 | 0 | 5.097 | 30 | 0 | 2 | 0 | 4.972 | 45 | 0 | 2 | 0 | 4.980 | 35 | 0 | 2 | 0 | 4.953 | 10 | 1 | 1 | 0 | 5.398 | 30 | 0 | 2 | 0 | 5.017 | 45 | 0 | 2 | 0 | 4.957 | 15 |
| 2 | 0 | 0 | 3.607 | 20 | 2 | 0 | 0 | 3.567 | 20 | 2 | 0 | 0 | 3.563 | 25 | 2 | 0 | 0 | 3.554 | 10 | 1 | 3 | 0 | 3.259 | 15 | 2 | 0 | 0 | 3.572 | 45 | 2 | 0 | 0 | 3.536 | 10 |
| 0 | 3 | 1 | 3.072 | 25 | 0 | 3 | 1 | 3.005 | 30 | 0 | 3 | 1 | 3.006 | 30 | 1 | 2 | 1 | 2.883 | 100 | 2 | 0 | 0 | 3.050 | 5 | 1 | 2 | 1 | 3.030 | 50 | 1 | 2 | 1 | 2.998 | 10 |
| 2 | 2 | 0 | 2.945 | 100 | 1 | 2 | 1 | 2.897 | 95 | 1 | 2 | 1 | 2.897 | 90 | 2 | 2 | 0 | 2.883 | 15 | 2 | 1 | 0 | 2.994 | 10 | 2 | 2 | 0 | 2.911 | 100 | 2 | 2 | 0 | 2.882 | 95 |
| 1 | 2 | 1 | 2.785 | 40 | 2 | 2 | 0 | 2.897 | 70 | 2 | 2 | 0 | 2.897 | 40 | 2 | 2 | 1 | 2.737 | 85 | 0 | 2 | 1 | 2.951 | 55 | 2 | 2 | 0 | 2.771 | 70 | 2 | 2 | 0 | 2.765 | 20 |
| 0 | 0 | 1 | 2.687 | 100 | 2 | 2 | 1 | 2.757 | 100 | 2 | 2 | 1 | 2.763 | 100 | 2 | 2 | 1 | 2.633 | 55 | 1 | 1 | 1 | 2.891 | 100 | 2 | 2 | 1 | 2.668 | 100 | 2 | 2 | 1 | 2.661 | 100 |
| 1 | 0 | 1 | 2.547 | 95 | 0 | 0 | 1 | 2.654 | 90 | 0 | 0 | 1 | 2.657 | 80 | 0 | 0 | 1 | 2.470 | 55 | 0 | 4 | 0 | 2.698 | 65 | 0 | 0 | 1 | 2.510 | 90 | 0 | 0 | 1 | 2.481 | 100 |
| 1 | 2 | 1 | 2.378 | 95 | 1 | 0 | 1 | 2.487 | 50 | 1 | 0 | 1 | 2.487 | 90 | 2 | 4 | 0 | 2.338 | 60 | 1 | 2 | 1 | 2.686 | 70 | 1 | 0 | 1 | 2.363 | 95 | 1 | 0 | 1 | 2.353 | 45 |
| 2 | 4 | 0 | 2.203 | 5 | 1 | 2 | 1 | 2.355 | 50 | 1 | 2 | 1 | 2.356 | 90 | 0 | 4 | 0 | 2.338 | 20 | 2 | 2 | 1 | 2.493 | 20 | 2 | 4 | 0 | 2.317 | 10 | 2 | 4 | 0 | 2.127 | 1 |
| 2 | 2 | 1 | 2.154 | 10 | 2 | 4 | 0 | 2.171 | 10 | 2 | 4 | 0 | 2.172 | 10 | 0 | 4 | 1 | 1.774 | 20 | 2 | 3 | 1 | 2.393 | 30 | 2 | 2 | 1 | 2.184 | 10 | 0 | 4 | 1 | 1.946 | 5 |
| 3 | 1 | 0 | 1.983 | 20 | 3 | 1 | 0 | 2.128 | 15 | 3 | 1 | 0 | 2.128 | 15 | 1 | 0 | 0 | 1.700 | 80 | 3 | 5 | 0 | 2.245 | 20 | 3 | 1 | 0 | 2.139 | 15 | 0 | 4 | 2 | 1.920 | 1 |
| 1 | 4 | 1 | 1.962 | 20 | 1 | 4 | 1 | 2.128 | 15 | 1 | 4 | 1 | 2.128 | 10 | 4 | 0 | 0 | 1.556 | 20 | 0 | 0 | 1 | 1.843 | 5 | 1 | 4 | 1 | 2.054 | 5 | 3 | 1 | 0 | 1.769 | 20 |
| 0 | 4 | 1 | 1.881 | 5 | 0 | 4 | 1 | 1.862 | 90 | 0 | 4 | 1 | 2.039 | 10 | 0 | 6 | 0 | 1.498 | 20 | 1 | 1 | 1 | 1.773 | 25 | 0 | 4 | 1 | 1.963 | 5 | 1 | 4 | 1 | 1.708 | 55 |
| 2 | 3 | 1 | 1.803 | 80 | 3 | 3 | 0 | 1.785 | 10 | 3 | 3 | 0 | 1.950 | 10 | | | | | | 4 | 0 | 1 | 1.701 | 25 | 3 | 3 | 0 | 1.941 | 10 | 0 | 4 | 1 | 1.578 | 20 |
| 4 | 3 | 0 | 1.738 | 10 | 4 | 0 | 1 | 1.710 | 15 | 1 | 4 | 1 | 1.931 | 15 | | | | | | 0 | 6 | 0 | 1.630 | 10 | 1 | 4 | 1 | 1.933 | 10 | 2 | 3 | 1 | 1.498 | 20 |
| 4 | 0 | 1 | 1.700 | 10 | 4 | 3 | 0 | 1.644 | 5 | 3 | 3 | 0 | 1.916 | 5 | | | | | | 2 | 3 | 1 | 1.581 | 25 | 2 | 3 | 1 | 1.868 | 85 | 4 | 0 | 1 | 1.473 | 20 |
| 4 | 3 | 0 | 1.667 | 70 | 0 | 2 | 1 | 1.634 | 5 | 2 | 3 | 1 | 1.861 | 55 | | | | | | 1 | 2 | 2 | 1.549 | 5 | 4 | 0 | 1 | 1.787 | 90 | 3 | 3 | 0 | 1.466 | 25 |
| 0 | 2 | 1 | 1.580 | 5 | 2 | 5 | 1 | 1.566 | 15 | 4 | 0 | 1 | 1.781 | 70 | | | | | | 4 | 2 | 1 | 1.475 | 5 | 1 | 2 | 2 | 1.721 | 10 | 4 | 3 | 0 | 1.440 | 15 |
| 2 | 5 | 1 | 1.566 | 75 | 4 | 3 | 0 | 1.503 | 40 | 4 | 3 | 0 | 1.710 | 5 | | | | | | 3 | 4 | 1 | 1.466 | 20 | 4 | 3 | 0 | 1.683 | 10 | | | | | |
| 0 | 0 | 2 | 1.554 | 5 | 0 | 0 | 2 | 1.479 | 25 | 0 | 0 | 2 | 1.677 | 20 | | | | | | 0 | 8 | 0 | 1.445 | 10 | 0 | 0 | 2 | 1.652 | 5 | | | | | |
| 1 | 0 | 2 | 1.536 | 5 | 1 | 0 | 2 | 1.466 | 30 | 1 | 0 | 2 | 1.657 | 15 | | | | | | 4 | 4 | 1 | 1.365 | 15 | 1 | 0 | 2 | 1.649 | 5 | | | | | |
| 1 | 2 | 2 | 1.525 | 5 | 1 | 2 | 2 | 1.448 | 50 | 1 | 2 | 2 | 1.645 | 5 | | | | | | | | | | | 1 | 2 | 2 | 1.576 | 15 | | | | | |
| 3 | 1 | 2 | 1.509 | 95 | 4 | 5 | 0 | 1.393 | 60 | 4 | 5 | 0 | 1.636 | 5 | | | | | | | | | | | 3 | 1 | 1 | 1.555 | 5 | | | | | |
| 2 | 2 | 2 | 1.496 | 70 | 2 | 2 | 2 | 1.381 | 5 | 2 | 2 | 2 | 1.569 | 35 | | | | | | | | | | | 2 | 2 | 2 | 1.535 | 2 | | | | | |
| 4 | 0 | 2 | 1.471 | 5 | 1 | 4 | 2 | 1.372 | 5 | 1 | 4 | 2 | 1.549 | 5 | | | | | | | | | | | 1 | 4 | 2 | 1.515 | 65 | | | | | |
| 1 | 4 | 2 | 1.447 | 5 | 3 | 1 | 2 | 1.356 | 5 | 3 | 1 | 2 | 1.525 | 5 | | | | | | | | | | | 3 | 1 | 2 | 1.485 | 80 | | | | | |
| 2 | 6 | 1 | 1.428 | 80 | 2 | 6 | 1 | 1.328 | 2 | 2 | 6 | 1 | 1.503 | 60 | | | | | | | | | | | 2 | 6 | 1 | 1.478 | 30 | | | | | |
| 6 | 4 | 1 | 1.392 | 55 | 4 | 3 | 1 | 1.315 | 2 | 4 | 3 | 1 | 1.479 | 80 | | | | | | | | | | | 4 | 3 | 1 | 1.455 | 55 | | | | | |
| 4 | 4 | 1 | 1.382 | 5 | 1 | 3 | 1 | 1.309 | 10 | 1 | 3 | 1 | 1.466 | 40 | | | | | | | | | | | 1 | 3 | 1 | 1.415 | 5 | | | | | |
| 4 | 1 | 1 | 1.343 | 55 | 1 | 8 | 0 | 1.287 | 10 | 1 | 8 | 0 | 1.448 | 50 | | | | | | | | | | | 1 | 8 | 0 | 1.386 | 60 | | | | | |
| 1 | 8 | 0 | 1.334 | 10 | | | | | | 0 | 2 | 2 | 1.393 | 10 | | | | | | | | | | | 0 | 2 | 2 | 1.365 | 5 | | | | | |
| 3 | 5 | 0 | 1.301 | 5 | | | | | | 2 | 1 | 2 | 1.381 | 60 | | | | | | | | | | | 2 | 1 | 2 | 1.335 | 20 | | | | | |
| 1 | 0 | 8 | 1.273 | 35 | | | | | | 3 | 3 | 1 | 1.372 | 5 | | | | | | | | | | | 3 | 3 | 1 | 1.321 | 2 | | | | | |
| | | | | | | | | | | 3 | 1 | 2 | 1.356 | 5 | | | | | | | | | | | 3 | 1 | 2 | 1.314 | 2 | | | | | |
| | | | | | | | | | | 4 | 1 | 1 | 1.328 | 2 | | | | | | | | | | | 4 | 1 | 1 | 1.291 | 10 | | | | | |
| | | | | | | | | | | 3 | 1 | 1 | 1.315 | 5 | | | | | | | | | | | 5 | 1 | 0 | 1.255 | 25 | | | | | |
| | | | | | | | | | | 5 | 1 | 0 | 1.309 | 2 | | | | | | | | | | | | | | | | | | | | |
| | | | | | | | | | | 0 | 1 | 1 | 1.287 | 10 | | | | | | | | | | | | | | | | | | | | |

Example F

A pressure bottle was charged with 0.27 g. of the orthorhombic platinum zinc oxide prepared by the method of Example 9, 10 ml. of acetic acid, and equal molar proportions of ethylene and hydrogen at 25° C. and 27 p.s.i. Rapid hydrogenation was observed.

The embodiments of the invention in which an exclusive property or privilege is claimed are defined as follows:

1. A platinum-metal oxide having the prototype formula, $Pt_3MO_6$, wherein M is selected from the group consisting of Mn, Fe, Co, Ni, Cu, Zn, Mg and Cd, the oxide characterized by having an orthorhombic crystal structure.

2. A platinum-metal oxide according to claim 1, wherein M is selected from the group consisting of Mn, Fe, Co, Ni, Zn, Mg and Cd; having characteristic orthorhombic space group, Cmmm, and lattice constants, $a$, $b$ and $c$, in the range:
   $a$ is from 7.08 to 7.22A,
   $b$ is from 9.86 to 10.20A, and
   $c$ is from 3.10 to 3.17A.

3. A platinum-metal oxide according to claim 2, wherein M is Mn and the lattice constants are in the range:
   $a$ is from 7.08 to 7.16A,
   $b$ is from 9.90 to 10.05A, and
   $c$ is from 3.11 to 3.16A.

4. A platinum-metal oxide according to claim 2, wherein M is Fe and the approximate lattice constants are:
   $a = 7.11$A,
   $b = 9.92$A, and
   $c = 3.10$A.

5. A platinum-metal oxide according to claim 2, wherein M is Co and the lattice constants are in the range:
   $a$ is from 7.08 to 7.09A,
   $b$ is from 9.92 to 9.93A, and
   $c$ is from 3.11 to 3.15A.

6. A platinum-metal oxide according to claim 2, wherein M is Ni and the lattice constants are in the range:
   $a$ is from 7.09 to 7.10A,
   $b$ is from 9.89 to 9.99A, and
   $c$ is from 3.11 to 3.12A.

7. A platinum-metal oxide according to claim 2, wherein M is Zn and the lattice constants are in the range:
   $a$ is from 7.12 to 7.14A,
   $b$ is from 9.86 to 9.98A, and
   $c$ is from 3.14 to 3.16A.

8. A platinum-metal oxide according to claim 2, wherein M is Mg and the lattice constants are in the range:
   $a$ is from 7.11 to 7.14A,
   $b$ is from 9.92 to 9.95A, and
   $c$ is from 3.13 to 3.15A.

9. A platinum-metal oxide according to claim 2, wherein M is Cd and the lattice constants are in the range:
   $a$ is from 7.20 to 7.22A,
   $b$ is from 10.19 to 10.20A, and
   $c$ is from 3.12 to 3.17A.

10. A platinum-metal oxide according to claim 1, wherein M is Cu; having characteristic orthorhombic space group, Pnnm or Pnn2 and lattice constants, $a$, $b$ and $c$, in the range:
    $a$ is from 6.10 to 6.12A,
    $b$ is from 11.56 to 11.62A, and
    $c$ is from 3.09 to 3.10A.

11. A platinum-metal oxide of orthorhombic crystal structure having the formula, $Pt_xM_yO_6$, wherein
    M is selected from the group consisting of Mn, Fe, Co, Ni, Cu, Zn, Mg and Cd;
    $x$ is from 2.2 to 3.2;
    $y$ is from 1.0 to 1.4; and
    $x+y$ is from 3.2 to 4.3.

12. A platinum-metal oxide according to claim 11, wherein $x$ is from 2.6 to 3.0, $y$ is from 1.0 to 1.4 and $x+y$ is from 3.6 to 4.3.

13. A platinum-metal oxide according to claim 11, wherein M is Mn and $x$ is from 2.6 to 2.8 and $y$ is from 1.3 to 1.4.

14. A platinum-metal oxide according to claim 11, wherein M is Co and $x$ is from 2.9 to 3.0 and $y$ is from 1.0 to 1.3.

15. A process for making orthorhombic platinum-metal oxides of prototype formula, $Pt_3MO_6$, comprising contacting a reactant selected from the group consisting of platinum, platinum oxides and platinum halides with at least one reactant selected from the group consisting of Mn, Fe, Co, Ni, Cu, Zn, Mg, Cd, and their oxides, in an oxygen-rich environment provided by
    reactant oxides,
    oxygen-rich atmosphere, or
    decomposition of $KClO_3$, $NaClO_3$ or other oxygen-rich compounds,
    at a temperature above about 500° C. and at a pressure of at least 100 atmospheres.

16. The process of claim 15, wherein the reactants are contacted in the presence of a member selected from the group consisting of water, aqueous HCl, aqueous $HNO_3$ and aqueous $H_2SO_4$.

* * * * *